United States Patent
Barton et al.

[15] 3,656,967
[45] Apr. 18, 1972

[54] PROCESS FOR PREPARING A BAKED TWO-PHASE PRODUCT

[72] Inventors: Ralph L. Barton, Battle Creek, Mich.; John C. Erwin, St. Anne, Ill.

[73] Assignee: General Foods Corporation, White Plains, N.Y.

[22] Filed: Jan. 21, 1970

[21] Appl. No.: 4,792

Related U.S. Application Data

[63] Continuation of Ser. No. 526,646, Dec. 21, 1965, abandoned.

[52] U.S. Cl. ............................................................99/86
[51] Int. Cl. .......................................................A21d 13/08
[58] Field of Search .........................................99/86, 88, 17

[56] References Cited

UNITED STATES PATENTS

| | | | |
|---|---|---|---|
| 1,596,652 | 8/1926 | Giovannetti | 99/86 UX |
| 1,969,361 | 8/1934 | Fajen | 99/86 |
| 2,060,490 | 11/1936 | Borbely et al. | 99/86 |
| 3,198,637 | 8/1965 | Harris et al. | 99/86 |

*Primary Examiner*—Raymond N. Jones
*Attorney*—LeFever, Quillinan & Hubbard

[57] ABSTRACT

A food comestible comprised of a humectant-containing filling enveloped in a baked dough crust, the relative moisture equilibriums of the crust and the filling being such that moisture is transferred from the dough to the filling when the comestible is heated.

1 Claims, No Drawings

PROCESS FOR PREPARING A BAKED TWO-PHASE PRODUCT

This application is a continuation of our prior application Ser. No. 526,646, filed Dec. 21, 1965, now abandoned.

This invention relates to a novel food-filled product adapted to be warmed and eaten after removal from a moisture proof package.

Briefly, the present invention comprises formulating a semi-moist filling having a high moisture equilibrium relative to an enveloping dough adapted to form a crust after baking; drying the filling and dough envelope, preferably preceded by baking, whereby the filling is cooked and the dough is converted to a baked condition; and packaging the so-processed comestible in a substantially moisture impermeable packaging material prior to equilibration of the moisture content of the two components. The moisture equilibrium of the filling is such relative to the crust that after moisture equilibration in the package the comestible undergoes a transfer of moisture from the crust to the filling when rapidly warmed prior to consumption. The filling formulation is of sufficient hygroscopicity to assure that upon warming, as by being subjected to an elevated temperature in the common household toaster, moisture from the crust will be absorbed by the filling due to inclusion in the latter of humectants.

In manufacturing the food-filled comestible, the relative moisture equilibriums of the filling and the crust dough will be such that the crust undergoes a greater moisture loss than the filling during baking and the difference in the moisture contents of the filling and the crust portions is increased. This moisture difference is further increased when the envelope is preferably subsequently further dried at below baking temperatures to further reduce the moisture contents of the filling and the crust portions until a point is reached whereat the filling will have a sufficiently higher moisture equilibrium than the crust and cause moisture to be transferred from the crust to the filling when the comestible is removed from the package and is rapidly warmed prior to consumption. As a result, the product, after moisture equilibration in the package, can be removed from the package and inserted in a household toaster whereby the crust will be further dried to develop the desirable crisp texture but will undergo a transfer of moisture to the filling such that the filling will retain its moisture content and upon being warmed will be converted from a semi-plastic to a desirably plastic condition depending upon formulation employed. In the case of fruits, the fruit product is converted into a fluid condition as opposed to a plastic condition. As a result, the filling will reassume a freshly baked character due to the preferential retention of moisture in the filling.

A typical filling will contain pureed fruit or fruit pieces of such fruits as strawberries, blueberries, raspberries, peaches, grapes, apples and the like, blended with a suitable mono- or di-saccharide or mixture thereof, such as sucrose, dextrose and/or invert sugar, together with a hydrophilic agent or humectant, such as glycerol, sorbitol, mannitol and the like in minor amounts, as well as moisture. The unbaked formulated filling moisture content will range anywhere from 15–45 percent and preferably will range from 30–40 percent. The dough portion will be formulated in a manner well known to those skilled in the bakery art from flour and like farinaceous materials taken with shortening and sugar and will have a moisture content ranging anywhere from 20–30 percent by weight of the dough, depending upon the desired eating quality of the crust prepared therefrom.

The filling phase and the crust phase may be combined in any one of a variety of functionally desirable and edifying ways. Thus, the filling can be enveloped between two crust layers in sandwich fashion; or the filling may be convoluted together with the crust phase, in which instance the filling would likewise be enveloped by adjacent phases of a crust such that the crust portion will desirably retain heat-softened filling and the latter will not migrate to the exterior of the crust portion preparatory to consumption.

The so-enveloped filling and crust dough are then baked to develop crust color, flavor and texture desired and to cook the filling, as a result of which the two components will reach undergo a moisture reduction. This moisture reduction usually is insufficient to achieve desired textural contrast between filling and crust when the comestible is eventually warmed in a "toaster." Usually, therefore, the baked comestible will be further dried so that the product has a combined moisture content of filling and crust in the range of 8–25 percent, preferably 12–17 percent. This combined moisture range will vary in accordance with the weight ratio of filling to crust which ratio will range from 0.5:1.0 to 1.5:1.0 depending upon filling and crust composition. Commonly the crust will be dried after baking to a moisture content less than 10 percent and in the neighborhood of 2–6 percent. Due to the higher moisture equilibrium of the filling, its moisture content reduction will be proportionably less relative to the crust and generally the moisture content of the filling in the envelope prior to drying will be less than 40 percent and greater than 8 percent. Although baking the filling and crust prior to drying is preferred, baking may be curtailed or eliminated but the product will in any event be dried to the afore-stated moisture content.

Just prior to packaging the dried filling portion should have an equilibrium moisture content in relationship to the crust portion such that: (i) after the product has been stored in a substantially moisture proof package, moisture transfer from the filling to the crust will be minimized, and (ii) while the comestible is being toasted, the filling will absorb moisture from the crust.

The product will be packaged in a substantially moisture impermeable package wherein, as a result of storage for a period of say 6 months, it will undergo a change in total product moisture no greater than 2 percent and preferably not greater than 1 percent. Illustratively, the product may be packaged in a plastic-coated flexible packaging material such as polyethylene-coated aluminum foil which has been fin sealed to assure minimal moisture migration from the interior of the product to the atmosphere. The two phases formulated will be cooled just prior to packaging to ambient room temperatures, say 40°–100° F. or in any event to a temperature low enough to assure minimum condensation of product moisture on the inner surface of the packaging material and whereby mold growth is avoided.

The filling enveloped in the product should be stable against microbiological spoilage, which stability may be assured by providing in the filling phase a sufficiently high level of water soluble compounds and/or acidulants to assure sufficient bacteriostasis at the moisture content for the filling portion selected, which moisture content will vary, of course, in accordance with the particular filling flavor desired.

It may be desirable to include in the filling and/or the crust, as an added precaution, a suitable antimycotic such as sorbic acid, benzoic acid, propionic acid, and salts and/or esters thereof, all of which are well known to those skilled-in-the-art. Generally, the level of antimycotic used will be less than 0.50 percent by weight of the crust and filling portions.

The two-phase comestible is intended to be warmed just prior to consumption over a comparatively short lapse of time, say in less than 10 minutes, and more particularly in the period of less than about 3 minutes, such as when the product is inserted into an electric toaster wherein it will be subjected to a temperature of 300°–600° F., more commonly about 425° F., for about 1–2 minutes. Thus, the products of the present invention are intended to be warmed comparatively rapidly, and as warmed, assume a desired eating quality wherein the filling will soften to a plastic condition and the crust will have a crisp fresh-baked texture.

More specifically, the dough for the crust will have a fat content of 8–25 percent, a sugar content of 4–16 percent, a flour content of 45–60 percent, leavening of 0.5–2.0 percent, 0–7 percent non-fat milk solids, 0–1.5 percent salt and the balance moisture and other minor ingredients.

The fat or shortening employed in the crust dough may be any shortening, although it is preferred to employ a shortening which is plastic in the temperature range of 70°- 90° F. Liquid shortenings may be employed although somewhat less desirable textural results are obtained. A preferred fat level is 10–18 percent. At shortening levels less than 8 percent, a more cracker-like crust is obtained which is less desired for most products, although even lower levels of fat may be practiced, depending upon the filling and crust relationship intended. At shortening levels of 25 percent by weight of the dough crust the product becomes extremely flaky and fragile and will not handle well.

The flour employed in the crust dough portion may be any farinaceous material such as hard or soft white wheat flour or any other cereal flour such as rye, rice, oat, barley and mixtures thereof.

The leavening employed in the dough may be employed at a level of 0.5–2 percent, and preferably 0.9 percent by weight of the dough. A typical leavening system would be sodium aluminum phosphate and sodium bicarbonate in a ratio of 1:1, or monocalcium phosphate and sodium bicarbonate in a ratio of 2:1. However, any commercial baking powder may be employed as the leavening system in the present invention.

If desired, non-fat milk solids may also be employed to soften or tenderize the dough crust. The non-fat milk solid may be employed at a level of 0–7 percent, and preferably 2.5 percent by weight of the dough. At levels greater than about 7 percent, a product which browns too rapidly upon baking and is not too satisfactory in storage is obtained.

Salt may be employed in the dough at a level of 0–1.5 percent, and preferably 0.8–1 percent by weight of the dough.

Preferably, the foregoing non-shortening dry ingredients are dry blended and shortening is added and creamed therewith and finally the aqueous liquids are added and sufficiently worked to make a dough of handleable and shapable consistency.

The filling employed in accordance with the present invention will preferably be a fruit filling as described hereinabove, but also may be one which contains other typically moist puree or paste-like preparations which are more flavorful in a moist condition such as meat, cheese and vegetables which, when moistened to a level of preferably in excess of 8 percent and to a moisture content of say as high as 45 percent, will exhibit a soft eating quality more or less typical of higher moisture products of comparable texture when such products are consumed warm. The materials forming the filling will commonly be in the form of a matrix which may be either highly comminuted or partly subdivided to either a puree or a coarser consistency, as the case may be, and these matrix materials will have infused therein a bacteriostatic level of solutes sufficiently low average molecular weight to increase the osmotic pressure of the aqueous solutions containing said solutes. The filling materials may have as an adjunct to such solutes, a hydrophilic colloid added thereto such as a pregelatinized starch which may not serve to significantly alter the osmotic pressure in the filling, but will serve to absorb water therein and thereby assist the solutions in their bacteriostatic effect on the filling matrix materials. The preferred technique is to employ sugars as solutes, the term "sugar" being understood to include the reducing and non-reducing water-soluble mono-saccharides and di-saccharides and the reducing and non-reducing polysaccharides and their degradation products; e.g., pentoses, including aldopentoses, methylpentoses, ketopentoses, like xylose and arabinose; a deoxyaldose like rhamnose; hexoses and reducing saccharides such as aldo hexoses like glucose, galactose and mannose; the ketohexoses, like fructose and sorbose; di-saccharides, like lactose and maltose; non-reducing disaccharides such as sucrose and other polysaccharides such as dextrin and raffinose; and hydrolyzed starches which contain as their constituents oligosaccharides.

Instead of sugars, other solutes may be employed where their use is compatible with flavor characteristic desired for meat, cheese and fillings, sugar being the more desirable solute for use with fruit matrix materials; in the case of meat, cheese and vegetable matrix materials some level of sugars may be employed but the use of such solids as inorganic salts is preferred. In many instances it will be further advantageous to supplement the role of the aforesaid solutes and/or colloids by employing a food grade acidulant such as phosphoric, citric, fumaric and like carboxylic acids which provide bacteriostasis due to their hydrogen ion effect when infused in the aforesaid filling matrix materials.

Fruit fillings will contain those fruits normally used in pie or pastry products. The fruits will be employed at a level of 20–40 percent by weight of the filling as formulated prior to baking. Dried fruits may be employed on an equivalent solids basis. Sugars like sucrose are preferably employed in the fruit filling at a level of 5–45 percent by weight thereof, typically in the neighborhood of 30–45 percent. Dextrose hydrate at a range 0–30 percent and typically from 10–20 percent may be used together with the sucrose.

It is essential to the present invention that the filling retain its ability to convert to a desirably soft plastic state when heated before or in preparation for serving. This property is usually obtained by employing a humectant such as glycerine, sorbitol, propylene glycol, invert sugar or the like, sugars like dextrose hydrate and mixtures thereof in compounding the fruit filling, such that the filling after baking and further drying, preparatory to packaging, will be of such hygroscopicity, in relation to the crust, that it will absorb and retain moisture from the crust incident to toasting. Accordingly, it will be desired in compounding the filling formulation, whether it be of the fruit or non-fruit-type, that it be formulated from materials at least some of which have a high equilibrium moisture or to which humectants have been added.

The filling formulation should also be one which is shape-retaining when applied to the crust dough so that individual shaped portions thereof may be deposited in a substantially localized manner. On the other hand, the filling formulation should be one which can be converted, despite the moisture reduction that ensues incident to baking and dehydration and equilibration in packaging between the filling and the crust, to a desirably soft eating texture. One ingredient which lends itself admirably to formulation of a fruit filling meeting these product requirements, is apple powder, that is, dessicated and powdered apple which has been found to absorb moisture by reason of the porous nature thereof, act as a humectant by reason of the naturally occurring sugars therein and provide a most desired fruity flavor. The apple powder may be used at a level ranging anywhere from 1–25 parts by weight of the filling formulation and typically will be employed at a level of 4–15 percent by weight of the filling prior to baking. Fruit fillings containing such a range of apple powder can be extruded in measured and shaped amounts at ambient room temperatures, i.e., at 40°–100° F. onto crust doughs preparatory to baking and drying and will desirably retain a sufficiently thixotropic character incident to subsequent baking and drying, such that the filling component will retain its identity as such and will not "bleed" or otherwise migrate between or through the crust dough or the crust prepared therefrom incident to the product baking, dehydration, packaging and/or storage.

The invention will now be more fully described by reference to typical processes whereby the two-phase comestible is manufactured.

EXAMPLE I.—STRAWBERRY FILLED COMESTIBLE

| Ingredient | Weight percent of component prior to baking | Weight percent of total product prior to baking |
|---|---|---|
| Dough: | | |
| Soft wheat flour | 55.38 | 33.888 |
| Plastic fat | 15.0 | 9.1 |
| Water | 14.7 | 9.0 |
| Granulated sugar | 10.1 | 6.2 |
| Dry non-fat milk solids | 2.9 | 1.8 |
| Leavening (sodium aluminum phosphate, plus sodium bicarbonate) | 1.0 | 0.6 |
| Sodium chloride | 0.9 | 0.5 |
| Potassium sorbate | 0.02 | 0.012 |
| Total | 100.0 | 16.1 |

Table – Continued

| Ingredient | Weight percent of component prior to baking | Weight percent of total product prior to baking |
|---|---|---|
| Filling: | | |
| Granulated sugar | 40.8 | 15.9 |
| Whole ripe strawberry puree | 35.9 | 14.0 |
| Humectant mixture (3.5 parts invert sugar to 1 part glycerol) | 9.8 | 3.7 |
| Pregelatinized corn flour | 7.3 | 2.8 |
| Dried apple powder | 4.9 | 1.9 |
| Strawberry flavor | 0.6 | 0.2 |
| Citric acid | 0.5 | 0.2 |
| Water | 0.1 | 0.1 |
| Color | 0.1 | 0.1 |
| Total | 100.0 | 38.9 |
| Grand total | | 100.0 |

Tabulated above are dough and filling formulations, the respective ingredients of the two components being specified in terms of weight per cent of the particular component as formulated prior to baking and being also computed as a weight percentage of the raw total combination filling and dough prior to baking.

The crust dough is prepared in a conventional manner by blending all dry ingredients in a ribbon mixer and the blending in the shortening until adequately dispersed. Thereafter, this mixture is transferred to a dough mixer wherein water is added followed by mixing to form a sheetable dough.

In preparing the food filling the sugar, citric acid and the color are dry blended; and the fruit puree, flavor, humectant mixture and water are then added. After the liquid ingredients have been blended with the dry ingredients specified, the apple powder and corn flour are added to the blend. The various ingredients are mixed together until they are sufficiently flowable and in a homogenous condition, whereafter the filling is deposited onto the crust dough surface and covered with a second top sheet of crust dough, all of the edges are then sealed by crimping the dough perimeter. While any size food-filled product may be prepared, it is preferred that the product have a thickness and overall dimension of a size such that it will permit receipt in a home toaster.

After the dough edges of the product have been crimped, the product is baked at a temperature of 300° to 425° F. for 20 or 6 minutes, respectively; preferably a temperature range of 350° F. for fifteen minutes to 375° F. for 8 minutes and most preferably, 365° F. for 10 minutes is employed during baking. As a result of such baking, the crust dough assumes a texture typical of a baked pastry product and the filling is cooked to the preferred edible condition; during this baking period the filling will commonly reach a temperature of 215°–220° F. Immediately after baking, the product will have a crust moisture generally less than 20 percent, and more typically in the neighborhood of 15 percent, and a filling moisture generally in excess of 25 percent, more typically in the neighborhood of 35 percent.

After baking, the product is dried to further lower the respective moisture contents of both the crust and the filling and to further increase the textural contrast between the filling and the crust, care being nevertheless exercised to assure that some minimal level of moisture is present in the crust below which palatability would be lost. Generally, the baked product will be dried to a point whereat the crust will have the desired crisp texture and the filling per se will retain a pliable plastic condition after extended periods of storage. Thus, immediately after drying the crust will have a moisture content in the neighborhood of 4 percent and the filling will have a moisture content less than 35 percent and in the neighborhood of 30 percent.

After such dehydration, the product is then allowed to cool to the aforesaid ambient room temperature range and is packaged in the aforesaid moisture impermeable packaging material. Typically, the moisture content of the packaged product may range anywhere from 8–25 percent, depending upon the ratio of filling to crust, it being preferred to employ a ratio of 60 parts of crust dough to 40 parts of filling with the preferred practice calling for generally a major weight per cent of crust dough, depending upon desired taste.

For a product formulated as tabulated above, moisture analysis at various stages of processing and final preparation were as follows:

| | Filling | Average percent moisture dough or crust | Combined |
|---|---|---|---|
| As formulated | 39.5 | 21.2 | 27.9 |
| After baking | 35.4 | 14.9 | 23.0 |
| After drying | 29.4 | 4.2 | 14.6 |
| Before toasting [1] | 16.9 | 10.0 | 13.6 |
| After toasting [1] | 18.7 | 8.3 | 12.3 |

[1] After thirty days of equilibrating storage in a moisture-proof package.

It will be noted from the foregoing tabulation of moisture analysis that incident to baking the filling undergoes a moisture reduction from 39.5 to 35.4 percent whereas the crust dough undergoes a moisture reduction from 21.2 to 14.9 percent. After further drying, the filling undergoes a similar moisture reduction from 35.4 to 29.4 percent by weight of the filling, whereas the baked crust undergoes a significantly greater percentage moisture reduction from 14.9 to 4.2 percent. It will thus be noted that the product as formulated had a much higher moisture equilibrium in the filling than in the crust. The product after drying and cooling, when inserted into a suitable moisture impermeable packaging material, undergoes an equilibration wherein the filling reaches a moisture content of 16.9 percent and the baked crust reaches a moisture content of 10 percent due to moisture migrating from the filling to the crust. However, once the two-phase comestible is removed from its package and inserted into a common household toaster, of the type described herein, the filling undergoes an increase in moisture content from 16.9 to 18.7 percent whereas the crust undergoes a moisture reduction from 10.0 to 8.3 percent while achieving a crisp flaky texture.

From the above it will be noted that the filling has been so formulated prior to combination with the crust dough that the filling actually increases in moisture upon being warmed in the common household toaster.

SWEET ROLL FORMULATION

The following table lists the ingredients for the dough and filling components of a typical sweet roll formulation embodying the precepts of the following example:

| Ingredient | Weight percent of component prior to baking | Weight percent of total product prior to baking |
|---|---|---|
| Dough: | | |
| Granulated sugar | 12.58 | 7.55 |
| Plastic vegetable shortening | 21.16 | 12.70 |
| Dry non-fat milk solids | 2.21 | 1.33 |
| Sodium chloride | 0.63 | 0.38 |
| Potassium sorbate | 0.63 | 0.02 |
| Water | 19.37 | 11.62 |
| Soft wheat flour | 44.02 | 26.41 |
| Total | 100.00 | 60.00 |
| Filling: | | |
| Granulated sucrose | 41.23 | 16.48 |
| Color | 0.15 | 0.06 |
| Sodium chloride | 0.45 | 0.18 |
| Pregelatinized corn starch | 6.75 | 2.70 |
| Flavor | 0.17 | 0.07 |
| Plastic shortening | 7.92 | 3.17 |
| Glycerol | 3.92 | 1.57 |
| Invert sugars | 36.44 | 14.58 |
| Sorbitol | 2.97 | 1.19 |
| Total | 100.00 | 40.00 |
| Grand total | | 100.00 |

The dough ingredients are mixed essentially as described in Example I. With respect to the filling, as in Example I, the sugar, color, salt and flavor are dry blended, then the vegetable shortening is creamed into the blend; thereafter the humectant mixture of glycerol, invert sugars and sorbitol is blended into the filling and similarly the starch is combined.

The filling is then extruded within the dough as the latter is extruded in cylindrical continuous tube, the composite envelope of dough and filling being thereafter convoluted or coiled to simulate the appearance of a typical bakery sweet roll. This convoluted structure is then baked in a manner essentially corresponding to that as specified in the previous example, and may thereafter be dried and packaged in a substantially moisture proof polyethylene coated aluminum foil package of the type described above.

As in the case of the fruit filling envelope product of Example I, when the sweet roll of this example is inverted into a typical household toaster and toasted under the conditions described in Example I, the crust will undergo a transfer of moisture to the filling by reason of the higher equilibrium moisture of the filling, the filling having a sufficiently high level of humectants therein to assure a softening of the filling component when the sweet roll is toasted.

We claim:

1. A method of manufacturing a two-phase food product comprising an outer dough portion and a fruit-type filling wherein, incidence to heating the product for consumption, a crisp outer dough crust is formed and the filling is heated and plasticized, said method comprising the steps of:

a. formulating said filling as a mixture of fruit filling ingredients and nutritious ingredients having a moisture content of 15–45 percent by weight and having humectant ingredients effective to minimize loss of said moisture during subsequent processing of the product in manufacture and during storage of the finished product prior to consumption, the humectant properties of said filling being substantially greater than those of said dough portion,
   b. formulating said dough portion as a mixture of edible ingredients including fat, sugar, flour, leavening and 20–30 percent moisture by weight, said dough portion forming a crisp crust on subsequent baking,
   c. sheeting said dough portion and interposing a layer of said filling between two dough sheets and then sealing the edges of the dough sheets, to form a two-phase product,
   d. baking and drying said two-phase product whereby the moisture content of the dough portion is reduced to not more than about 10 percent, and
   e. then packaging said two-phase product in a substantially moisture-impermeable wrapper.

* * * * *